United States Patent
Zhang et al.

(10) Patent No.: US 6,289,152 B1
(45) Date of Patent: Sep. 11, 2001

(54) MULTIPLE PORT, FIBER OPTIC COUPLING DEVICE

(75) Inventors: B. Barry Zhang, Lawrenceville, NJ (US); Liang-Ju Lu, Eden Prairie, MN (US)

(73) Assignee: ADC Telecommunications, Inc., Minnetonka, MN (US)

( * ) Notice: Subject to any disclaimer, the term of this patent is extended or adjusted under 35 U.S.C. 154(b) by 0 days.

(21) Appl. No.: 09/181,145

(22) Filed: Oct. 27, 1998

(51) Int. Cl.⁷ ......................................... G02B 6/32
(52) U.S. Cl. ................... 385/33; 385/31; 385/20; 385/27; 359/281
(58) Field of Search ........................ 385/33, 11, 31, 385/49, 20, 116, 43, 37, 14, 27, 36, 39, 88, 93; 359/495, 281, 487, 497, 499; 372/75, 6; 349/57, 70

(56) References Cited

U.S. PATENT DOCUMENTS

| | | | |
|---|---|---|---|
| 5,315,431 | 5/1994 | Masuda et al. | 359/281 |
| 5,402,509 | 3/1995 | Fukushima | 385/33 |
| 5,446,578 | 8/1995 | Chang et al. | 359/282 |
| 5,452,122 | 9/1995 | Tsuneda et al. | 359/281 |
| 5,574,809 | 11/1996 | Watanabe et al. | 385/31 |
| 5,642,447 | 6/1997 | Pan et al. | 385/31 |
| 5,642,448 | 6/1997 | Pan et al. | 385/31 |
| 5,757,993 | 5/1998 | Abe | 385/34 |
| 6,014,244 | * 1/2000 | Chang | 385/33 X |

FOREIGN PATENT DOCUMENTS

| | | |
|---|---|---|
| 29 08 105 | 9/1980 | (DE) . |
| 199 01 186 | 7/1999 | (DE) . |
| 0 141 697 | 5/1985 | (EP) . |
| 0 215 973 | 9/1985 | (EP) . |
| 0 915 358 A2 | 5/1999 | (EP) . |
| 2 304 203 A | 3/1997 | (GB) . |
| WO 98/23983 | 6/1998 | (WO) . |

OTHER PUBLICATIONS

Shiraishi, *Polarization–Independent In–Line Optical Isolator with Lens–Free Configuration*, Dec. 10, 1992, No. 12 New York, US, pp. 1839–1842.

\* cited by examiner

*Primary Examiner*—Phan T. H. Palmer
(74) *Attorney, Agent, or Firm*—Altera Law Group, LLC (57) ABSTRACT

A coupling device has a first focusing element positioned on a first optical axis. The first focusing element is couplable to receive output light beams from a plurality of optical fibers, and has a first focusing power selected to direct the light beams to intersect the first optical axis at a first intersection position. A second focusing element is spaced apart from the first focusing element by a first separation distance along the first optical axis and is positioned to receive the light beams from the first focusing element. The second focusing element has a second focusing power and the first separation distance is selected to parallelize the light beams received from the first focusing element. A system for providing access to light beams propagating through a plurality of fibers uses two of the coupling devices. The two devices are relatively oriented to have opposing second focusing elements so that a beam path of at least one of the parallellized beams from the first device lies coincident and antiparallel to a beam path of at least one of the parallelized beams from the second device.

38 Claims, 7 Drawing Sheets

MULTIPLE PORT, FIBER OPTIC COUPLING DEVICE

BACKGROUND

The present invention is directed generally to a fiber optic device, and more particularly to a device for producing parallelized output beams from a multiplicity of fibers.

Optical fibers find many uses for directing beams of light between two points. Optical fibers have been developed to have low loss, low dispersion, polarization maintaining properties and can also act as amplifiers. As a result, optical fiber systems find widespread use, for example in optical communication applications.

However, one of the important advantages of fiber optic beam transport, that of enclosing the optical beam to guide it between terminal points, is also a limitation. There are several optical components, important for use in fiber systems or in fiber system development, that are not implemented in a fiber-based form where the optical beam is guided in a waveguide. Instead, these optical components are implemented in a bulk form that light must freely propagate through. Examples of such components include, but are not limited to, isolators, circulators, polarizers, switches and shutters. Consequently, the inclusion of a bulk component in an optical fiber system necessitates that the optical fiber system have a section where the beam path propagates freely in space, rather than being guided within a fiber.

Free space propagation typically requires that the beam from each fiber be collimated and directed along the axis of the bulk component being used in the free-space propagation section. Usually, this necessitates that a collimating lens be positioned at the input fiber to collimate the incoming light and a focusing lens be positioned at the output fiber to focus the freely propagating light into the output fiber. The free-space propagation section lies between the two lenses. The introduction of a free-space propagation section requires that the collimating lens and the focusing lens are each aligned to their respective fibers and also that the focusing lens is correctly aligned relative to the collimated beam path from the collimating lens. The alignment of the collimating and focusing lens remains critical, irrespective of the number of fibers. Accordingly, the alignment process becomes more complex and time consuming when multiple fibers require the alignment of multiple collimating and focusing lenses.

In addition, each collimating and focusing lens and each fiber has to be supported transversely. The provision of transverse support increases the total cross-section required by each fiber/lens assembly, thus resulting in a large system.

Accordingly, there is a need for an improved approach to introducing a free-space propagation section into fiber optic systems that is simpler to align and is more compact.

SUMMARY OF THE INVENTION

Generally, the present invention relates to a device that produces parallel optical beams from a plurality of optical fibers, and to a system that uses two such devices to produce a free-space propagation region within a fiber optic network.

One embodiment of the invention is a device that permits two-way coupling between a free-space optical component and a plurality of fibers. The device includes an assembly couplable to the fibers receive light. The assembly includes a first focusing element positioned on a first optical axis to receive output light beams from the optical fibers, where the first focusing element has a first focusing power selected to direct the light beams to intersect the first optical axis at a first intersection position. A second focusing element is spaced apart from the first focusing element by a first separation distance along the first optical axis and positioned to receive the light beams from the first focusing element, the second focusing element having a second focusing power, the first separation distance being selected to parallelize the light beams received from the first focusing element. The assembly may be provided with pig-tailed fibers.

Another embodiment of the invention is a system for providing access to light beams propagating through a plurality of fibers. The system includes first and second sets of optical fibers and two coupling modules coupled to a respective set of optical fibers. Each coupling module includes a first focusing element positioned on a module optical axis that is coupled to receive light beams from output ends of the respective set of optical fibers. The first focusing element has a first focusing power selected to direct the light beams to intersect the module optical axis. The coupling module also has a second focusing element spaced apart from the first focusing element by an interelement separation distance along the module optical axis and positioned to receive the light beams from the first focusing element. The second focusing element has a second focusing power and the interelement separation distance is selected to parallelize the light beams received from the first focusing element. The first and second coupling modules are relatively oriented to have opposing second focusing elements so that a beam path of at least one of the parallellized beams from the first coupling module lies coincident and antiparallel to a beam path of at least one of the parallelized beams from the second coupling module.

Another embodiment of the invention is a method of producing a set of parallel light beams from outputs from a first set of optical fibers. The method includes arranging output faces of the optical fibers relative to a first focusing element and directing, with the first focusing element, output light beams from the optical fibers to intersect a first optical axis. The method also includes parallelizing, with a second focusing element, the output light beams so that the light beams intersecting the first optical axis propagate in essentially parallel directions.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical fiber systems, and is believed to be particularly suited to introducing a free-space propagation section into an optical fiber system. The approach presented here may be simpler to align than conventional systems and be more compact.

The present system typically includes use of a coupling module that receives the input from a number of input fibers and generates a set of freely propagating, parallel optical beams. This is termed a parallelizing operation. The coupling module is simple to align and includes only two lenses, irrespective of the number of input fibers. The coupling module may be used to couple the light from the fibers to a free-space device, for example a detector array.

The coupling module can also be used in a reverse manner, to receive a number of parallel, freely propagating beams and to focus these beams into a number of output fibers. This is termed a deparallelizing operation.

Since each coupling module can be used for both parallelizing and deparallelizing operations, a free-space coupling unit can be constructed having a region for free-space propagation between two coupling modules. The first coupling module parallelizes light from one set of fibers to generate parallel beams propagating through the free-space propagation region. The second coupling module deparallelizes the light into the second set of fibers. Likewise, for light travelling in the opposite direction through the fiber system, the second coupling module parallelizes light received from the second set of fibers to propagate freely along parallel beam paths in the free-space propagation section. The first coupling module deparallelizes the light into the first set of fibers.

Figure 1A:
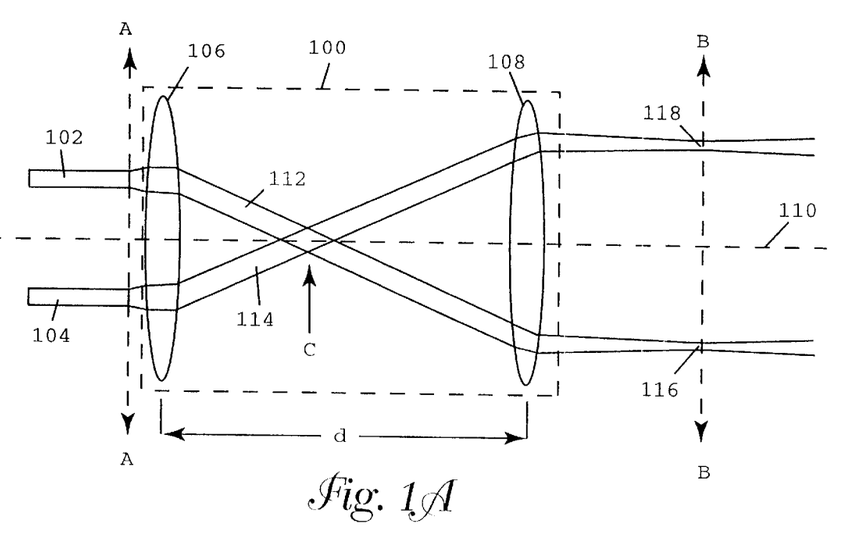
FIGS. 1A and 1B illustrate different embodiments of a multiple beam coupling module according to the present invention.

A schematic of a coupling module 100 is illustrated in FIG. 1A, showing the optical paths followed by beams from two input fibers, 102 and 104. No limitation on the number of input fibers is suggested by the illustration of only two input fibers. Two fibers are employed in the illustration for the purposes of clarity and simplicity of the following explanation.

The coupling module 100 includes two lenses, a first lens 106 and a second lens 108, positioned on the optical axis 110. The light paths 112 and 114, from fibers 102 and 104 respectively, pass through the first lens 106 and are directed to cross the optical axis 110 at the position marked C. Where the outputs of the fibers 102 and 104 are aligned parallel to the optical axis 110, the position C is separated from the first lens 106 by a distance equal to the focal length, f1, of the first lens 106. After crossing the axis 110, the beam paths 112 and 114 propagate to the second lens 108 which is positioned at a separation "d" from the first lens 106. Where the second lens has a focal length f2, the separation d is approximately equal to f1+f2. Following transmission through the second lens 108, the beam paths 112 and 114 propagate parallel to the optical axis 110.

Although the beam paths 112 and 114 are illustrated to be collimated between the two lenses 106 and 108, this is not a necessary condition. Collimation of the beam paths 112 and 114 between the first and second lenses 106 and 108 depends on the divergence of the optical beams passing out of the optical fibers 102 and 104, the separation between the first lens 106 and the fibers 102 and 104, and the focal length of the first lens.

After transmission through the second lens 108, the beam paths 112 and 114 converge to produce beam waists 116 and 118 respectively, where a beam waist is the narrowest width of the beam, found at a focus. The beam waists 116 and 118 are located in the plane BB, designated by a dashed line. The separation distance between the plane BB and the second lens 108 depends on the divergence of the light beams entering the first lens 106, and the separation distance between the output faces of the fiber 102 and 104. The separation distance d is set to be equal to f1+f2 in order to maintain a parallel output from the second lens 108 and is not available as an adjustment.

Each beam waist 116 and 118 forms an image of the output face of the respective fiber 102 and 104. It is an important feature of the invention that the coupling module 100 relay an image of the output faces of the fibers 102 and 104, lying on the input plane AA designated by a dashed line, to the image plane BB. The image formed at plane BB may be a magnified image.

The first and second lenses may be different types of lens, for example, they may be spherical or aspheric, and may be bi-convex, plano-convex or meniscus. The selection of lens type is dependent on the particular system and the level of acceptable optical aberration, which translates to optical loss.

Figure 1B:
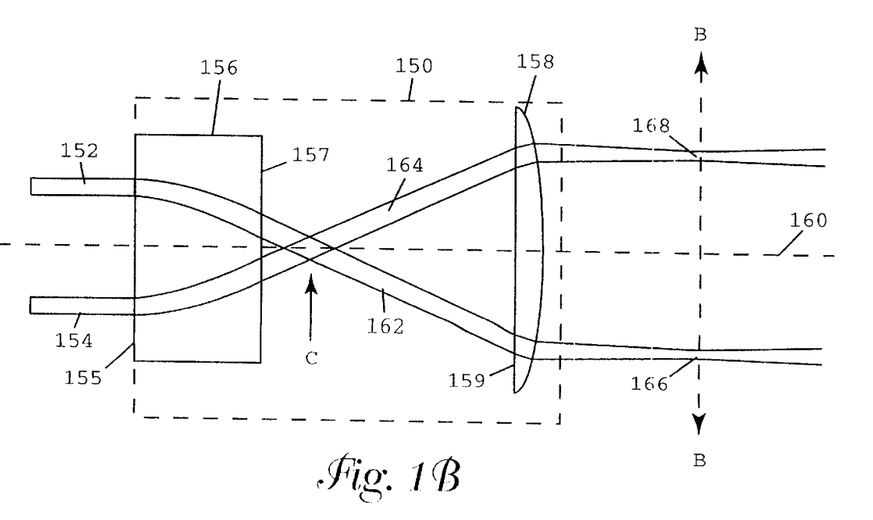

Another embodiment of a coupling module 150 is illustrated in FIG. 1B. The coupling module 150 receives the output from two input fibers 152 and 154. The coupling module 150 includes first and second lenses 156 and 158 aligned along an optical axis 160. The first lens 156 is a gradient index (GRIN) lens, a type of lens commonly used in conjunction with optical fibers due to the barrel shape and the flat optical surfaces that are perpendicular to the lens axis. The GRIN lens 156 may be of any suitable pitch that diverts the beam paths 162 and 164 to cross the axis 160. If the GRIN lens is a quarter pitch lens, the output face 157 of the GRIN lens is positioned at the crossing point C. Where the GRIN lens 156 has a pitch of less than 0.25, for example in the range 0.18 to 0.23, the crossing point C lies beyond the output face 157. Similarly, where the pitch of the GRIN lens 156 is more than 0.25, then the crossing point C lies within the GRIN lens 156.

The second lens 158 may be, for example, a plano-convex aspheric lens, oriented with the planar surface 159 oriented towards the crossing point C to reduce aberration effects.

The coupling module 150 relays an image of the input plane to the image plane BB. Where the fibers 152 and 154 are butted up against the GRIN lens 156, the input plane is coincident with the input face 155 of the GRIN lens 156. The image plane BB may also be referred to as the conjugate plane, because the beam waists 166 and 168 may be regarded as conjugate images of the output faces of the fibers 152 and 154.

The coupling modules 100 and 150 may be used in applications where inputs are received from a number of fibers to be delivered to a non-fiber component or system. For example, the coupling modules 100 and 150 may be used to couple the outputs from fibers in a fiber array to corresponding detectors in a detector array. The coupling modules 100 and 150 may also be used for coupling a free space input of multiple beams to an array of fibers. For example, in one approach to demultiplexing dense wavelength division multiplexed (DWDM) signals, a single, multiplexed, optical beam is diffracted from a curved diffraction grating. The components at different wavelengths, separated by the grating, may be coupled by the coupling module into a number of fibers, each fiber corresponding to one of the wavelength components.

Figure 4:
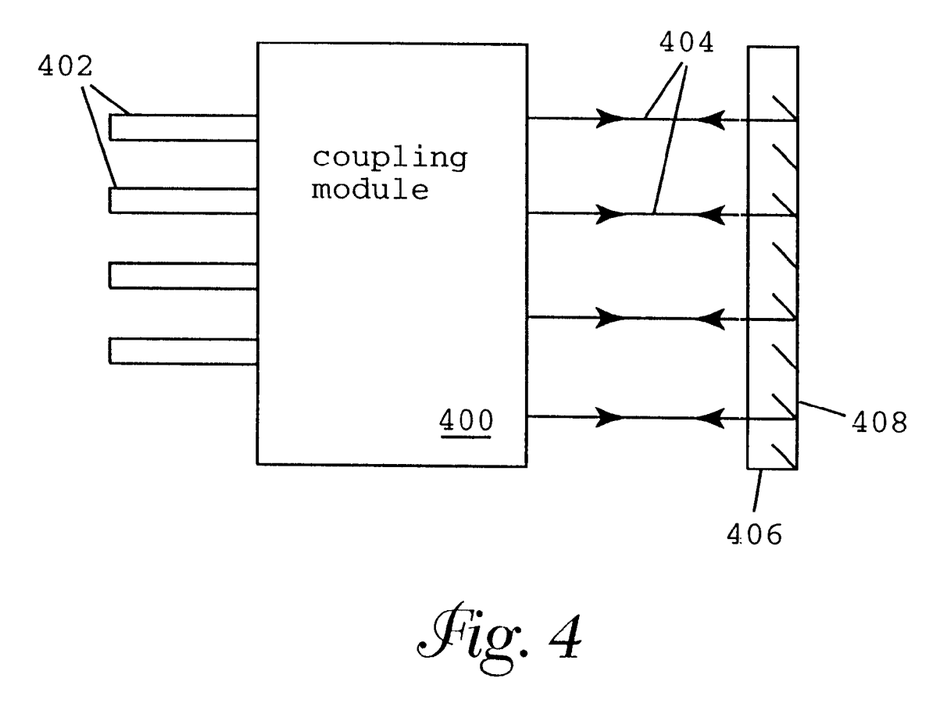
FIG. 4 illustrates a configuration of a single coupling module.

FIG. 4 illustrates another application of a single coupling module 400 used with free space components. Several fibers 402 are coupled to the coupling module 400 to produce corresponding parallel, free-propagating beams 404. The free-propagating beams 404 pass through a Faraday rotator 406 that rotates polarization of the incoming beams through 45°. A reflector 408, which, for example, may be a reflective coating on the rear surface of the Faraday rotator 406, retroreflects the beams 404 back through the Faraday rotator for a further 45° rotation. The reflector 408 is positioned at the conjugate plane, or that plane containing the focus of each beam 404 after passing through the second focusing element of the module 400, so that each beam 404 is coupled back into its corresponding fiber 402. Such an arrangement results in a polarization rotated beam propagating in a backwards direction through each fiber 402. This may permit the compensation of unwanted polarization effects within the fibers 402. The reflector 408 may also be provided as a separate element spaced apart from the Faraday rotator, and need not be a reflective coating on the Faraday rotator.

Figure 2A:
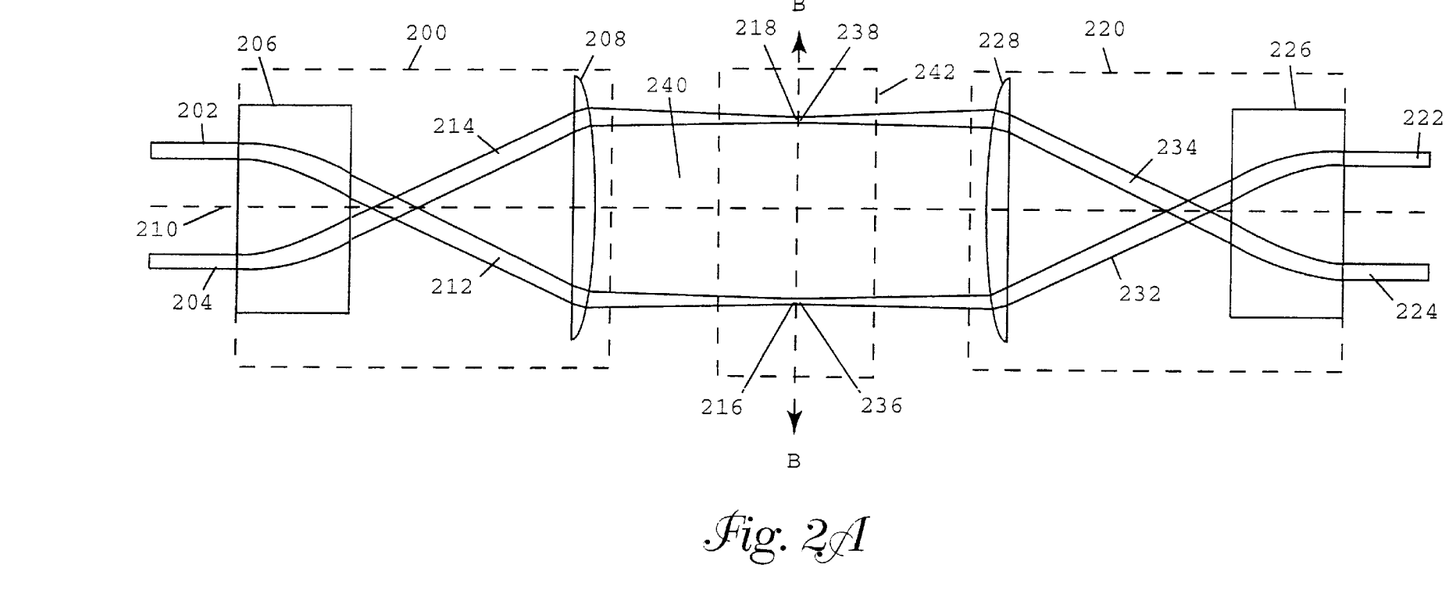
FIG. 2A illustrates a pair of multiple beam coupling modules used in conjunction with multiple fibers to produce a free-space propagation region, according to an embodiment of the present invention.

FIG. 2A illustrates a free-space device that uses two opposing coupling modules to create a region of free-space propagation within an optical fiber system. The two coupling modules 200 and 220 are arranged along the same optical axis 210, although this need not be the case, as is discussed below.

The first coupling module 200 receives input light from input fibers 202 and 204. The first coupling module 200 has a first GRIN lens 206 and a second aspherical lens 208. As discussed above, other types of lenses may also be used. The beam paths 212 and 214 are directed to cross the optical axis 210 by the first lens 206 and are parallelized by the second lens 208 to be parallel with the optical axis 210. In addition, the beam paths 212 and 214 converge to beam waists 216 and 218 at the image plane BB. In other words, the first coupling module 200 relays an image of the input plane, the plane upon which the exit faces of the input fibers 202 and 204 are located, to the image plane at BB.

The second coupling module 220 is coupled to fibers 222 and 224. The second coupling module 220 has a first GRIN lens 226 and a second aspherical lens 228. As discussed above, other types of lens may also be used. The beam paths 232 and 234 are directed to cross the optical axis 210 by the first lens 226 and are parallelized by the second lens 228 to be parallel with the optical axis 210. In addition, the beam paths 232 and 234 converge to beam waists 236 and 238 at the image plane BB. In other words, the coupling module 220 relays an image of its input plane, the plane upon which the exit faces of the input fibers 222 and 224 are located, to the image plane at BB.

When the beam waists 216 and 236 from the two first fibers 202 and 222 are collocated at the plane BB then, by reciprocity, the image of the exit face of the fiber 202 is focused to the exit face of the corresponding fiber 222, and the image of the exit face of the fiber 222 is focused to the exit face of the fiber 202. Likewise, the image of the exit face of fiber 204 is focused to the exit face of the fiber 224, and vice versa.

Using this system, light coupled out of each fiber is propagated through the free-space region 240 between the two coupling modules 200 and 220, and is redirected into corresponding fibers on the other side of the free-space region. A bulk optical component 242 may be placed between the two coupling modules 200 and 220 to operate on the optical beams propagating through the free-space region 240. As previously described, the bulk optical component is a component that is not implemented in an optical fiber form, and may be an optical switch or array of optical switches, a spatial light modulator, an isolator, a circulator, a filter or some other bulk optical component. The separation between the coupling modules 200 and 220 may be adjusted to compensate for the optical path length traveled through the bulk optical component 242, so that the conjugate planes of each coupling module 200 and 220 remain coincident.

In one particular embodiment, the coupling modules 200 and 220 are made to be identical. In other words, the first lenses 206 and 226 have the same focal length, f1 (or pitch in the case of a GRIN lens), the second lenses 208 and 228 have the same focal length, f2, and the interelement separation between the first and second lenses within each coupling module, d, is the same. An advantage provided when the first and second coupling modules are the same is that the size of the beams focused into the second set of fibers is the same as the size of the beams emitted by the first set of fibers and vice versa. Another advantage provided by this symmetrical arrangement is that the fabrication and assembly process is simplified.

Where the images formed by each coupling module 200 and 220 are not coincident on the same image plane BB, the optical coupling efficiency from one set of fibers to the other set of fibers may be reduced. Further, it will be appreciated that for efficient transfer of optical power from the first set of fibers to the second set of fibers, and vice versa, the geometrical arrangement of each set of fibers should correspond with the other. For example, where the coupling modules 200 and 220 are identical and produce symmetrical imaging from one fiber set to the other, it is important that the lateral displacement and azimuthal position of one fiber, e.g. fiber 202, relative to the optical axis is the same as that for its corresponding, e.g. fiber 222. However, there is no requirement that the coupling modules 200 and 220 be identical.

It is not necessary that the fibers be coupled to the coupling module in a one-dimensional pattern. The fibers may also be coupled in a two-dimensional pattern. The separation between different fibers may be regular, as in an array, or may be irregular. Generally, corresponding fibers on either side of the system are positioned relative to the optical axis to mutually transmit and receive light. Thus, where the set of fibers associated with one coupling module is arranged in, for example, a 4×4 array, the set of corresponding fibers associated with the other coupling module is also in a 4×4 array. The spacing between fibers in each array may be different, depending on the optical properties of each coupling module 200 and 220. It will be appreciated that, although the fibers in one fiber set may advantageously be arranged in a symmetrical manner around the optical axis, a symmetrical arrangement is not a necessary condition, and the fibers may be arranged in an asymmetrical arrangement about the axis. Further, there is no requirement that there be a one-to-one correspondence between the fibers on either side of the system. Accordingly, there may be coupling of only just one beam from one coupling module to the other coupling module, even though each coupling module is provided with multiple beam paths.

Figure 2B:
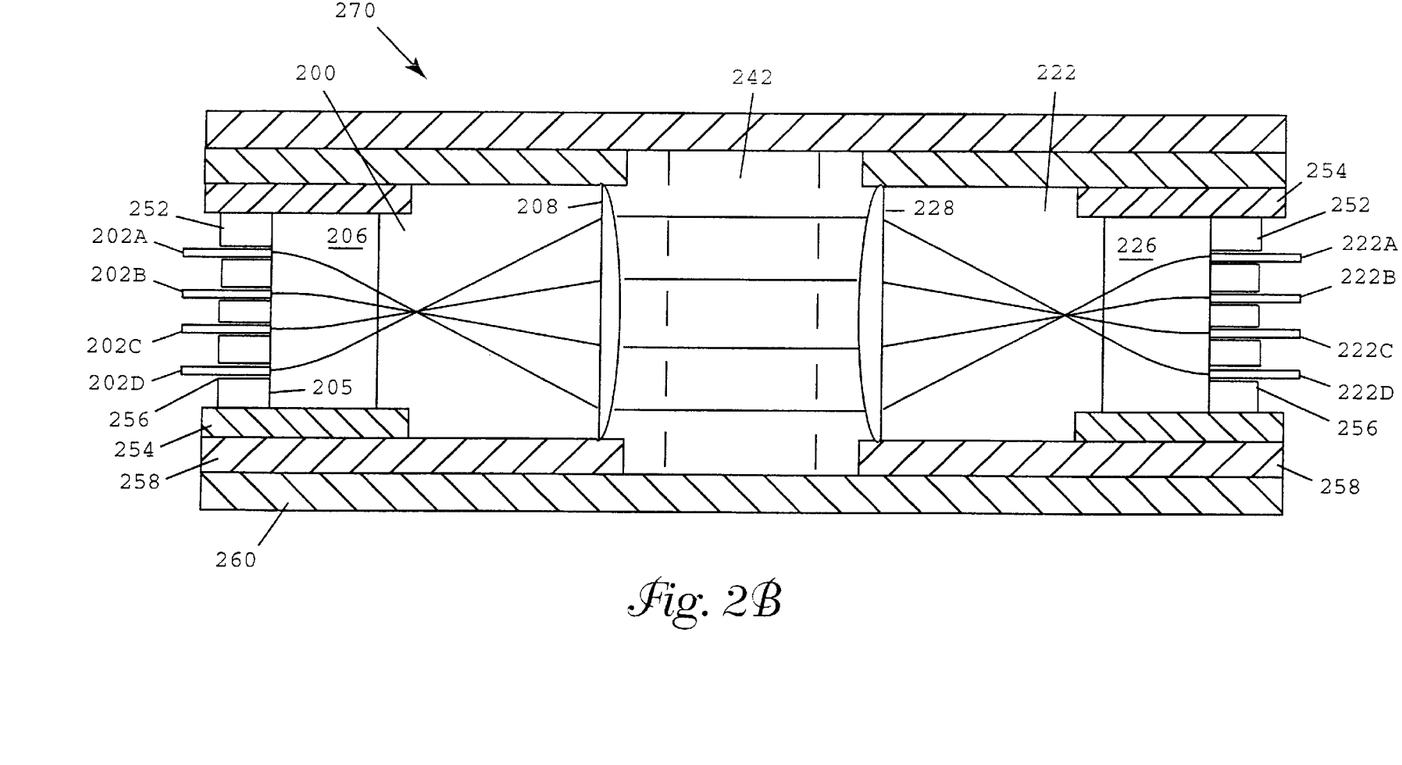
FIG. 2B illustrates a practical embodiment of the example illustrated in FIG. 2A.

Another embodiment of a free-space device is illustrated in FIG. 2B. The optical coupling modules are the same as those illustrated in FIG. 2A, but four optical fibers are coupled to each side of the device, rather than two. Additionally, the optical path between fiber sets is traced out for simplicity, rather than illustrating the width of the optical beam. Each fiber may be regarded as a port enabled for input and output to the device. It can be seen that port 202A on the left side of the device has an optical path coupling to port 222A on the right side of the device. Likewise, ports 202B, 202C, and 202D on the left side of the device have optical paths coupling to corresponding 222B, 222C, 222D on the right side of the device. The device illustrated in this figure also includes mounting components for holding the optical components in position relative to each other. Although the illustrated mounting components may be cylindrical, this is not intended to be a limitation of the invention, and the mounting components may have a non-circular cross-section, for example square.

The fibers at ports 202A to 202D are butted against the input face of the 205 of the GRIN lens 206. The fibers are held by a chuck 252 that is mounted within first mounting ring 254. The fibers at ports 202A to 202D pass through apertures 256 through the chuck 252 and may be held in place within the chuck by, for example, an epoxy or other suitable adhesive. The chuck 252 and the GRIN lens 206 may be held in place within the first mounting ring 254 by epoxy or other suitable adhesive. The ends of the fibers at ports 202A to 202D and the input face of the GRIN lens 206 may be polished at a small angle, for example 8°, and be anti-reflection coated to reduce return reflections.

The coupling module 200 is formed with the first mounting ring 254 and the second lens 208 each mounted within a module ring 258. The first mounting ring 254 and the second lens 208 may also be epoxied in place, or mounted using any other suitable method, such as another adhesive or soldering. In assembly, the second lens 208 is mounted within the module ring 258 and then the first mounting ring is positioned within the module ring 258. The separation between the GRIN lens 206 and the second lens 208 is adjusted until the beam paths beyond the second lens are parallel. One method of ensuring that the beam paths are parallel is to measure the amount of light retroreflected into each fiber by a mirror placed behind the second lens while adjusting the interelement separation between the GRIN lens 206 and the second lens 208. The free space beams are deemed to be parallel when the level of retroreflected light in each fiber is optimized at the same interelement separation. The level of retroreflected light may further be optimized when the mirror is positioned at the conjugate plane of the coupling module. The first mounting ring 254 is then fixed at the position that is identified as producing parallel beams, using epoxy, adhesive, soldering, or some other suitable method.

Two identical modules 200 and 220 are then positioned within an outer sleeve 260, separated by the bulk optical component 242. The relative orientation between the modules 200 and 220, and the intermodule separation are set so as to achieve maximum optical coupling between the modules 200 and 220. The optimum intermodule separation is achieved when the image plane of the first module 200 coincides with the image plane of the second module 220, as discussed above. The modules 200 and 220 are then fixed in position within the outer sleeve 260 at the optimum relative orientation and intermodule separation. The modules 200 and 220 may be fixed using epoxy, adhesive, soldering, or any other suitable method.

The bulk optical component 242 may be positioned within the outer sleeve 260 as illustrated, or may be mounted on one of the modules prior to that module being inserted into the outer sleeve 260.

It is common for a component such as the assembly shown, to be provided to the user with fiber pig-tails for coupling to the fibers of a fiber optic system, for example by fusion splicing, using a connector, or in some other appropriate manner. Accordingly, the fibers 202A to 202D and 222A to 222D may be fiber pig-tails that are rigidly attached to whole assembly 270. However, this is not a limitation of the device, and the fibers of the fiber optic system may be directly coupled to the first focusing elements of the free-space coupling device 270.

Such an assembly may be very compact. In some embodiments of the invention, the GRIN lenses 206 and 226 may have a length of a few millimeters, while the second lens may have a focal length in the range of around 2–10 mm. Accordingly, the overall length of the device, between GRIN lenses, may be in the range of approximately 8 to 40 mm, although larger or smaller devices may also be formed.

It will be appreciated that other methods of assembling coupling modules and of mounting modules to produce a free-space coupling device may be employed, and the invention is not limited to those methods illustrated here. For example, the coupling modules may be mounted separately on a bench top with adjustable mounts to provide the necessary degrees of freedom for alignment of the parallel beam paths of each coupling module.

Figure 3A:
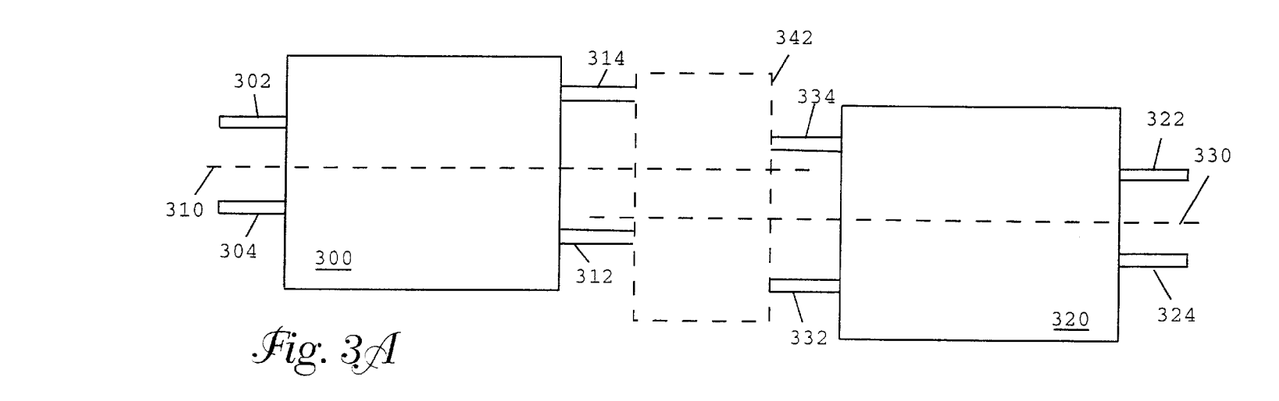
FIGS. 3A–3D illustrate different configurations of coupling modules to accommodate bulk optical components having different optical geometries.
Figure 3B:
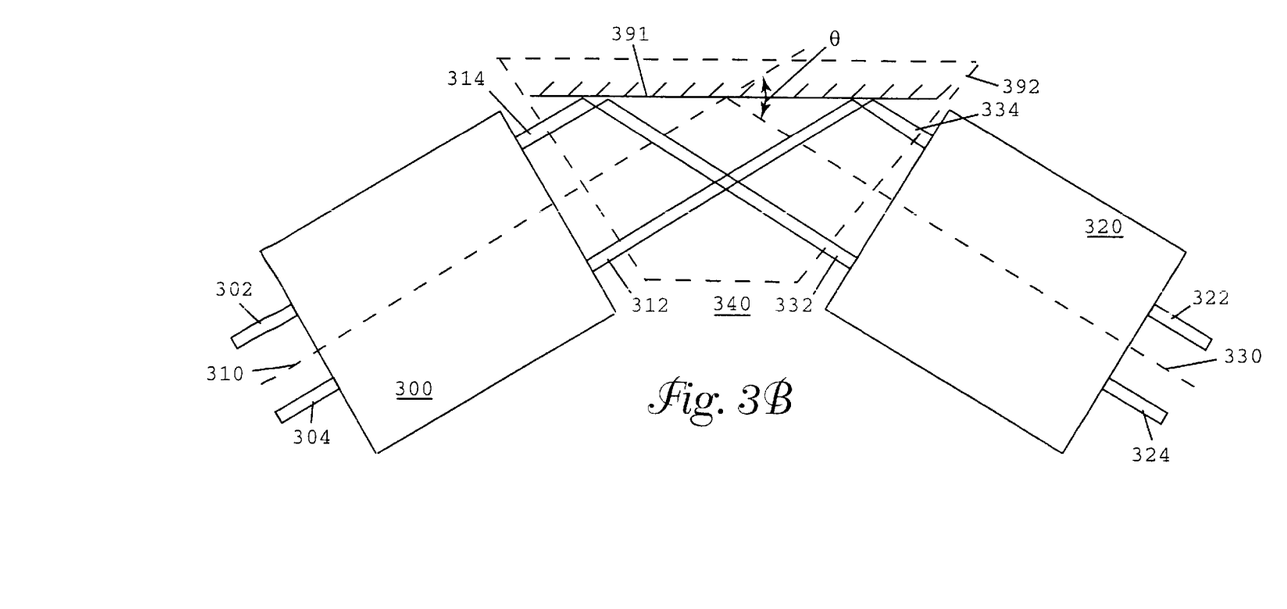
Figure 3C:
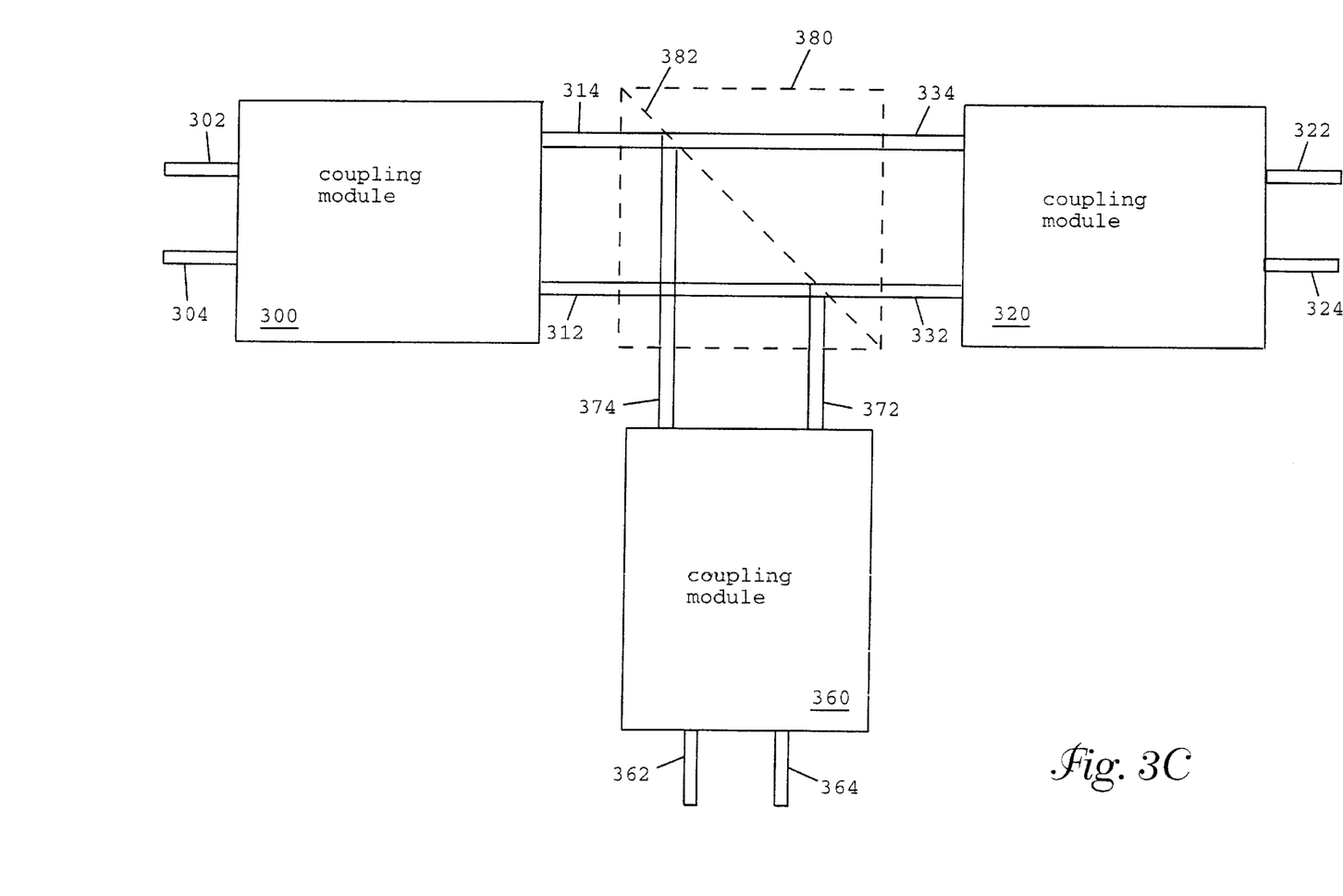

Different embodiments of free-space coupling device are illustrated in FIGS. 3A to 3C. In the embodiments illustrated in FIGS. 3A and 3B, the optical axis of each coupling module is not coincident with the optical axis of the other coupling module. An embodiment in which the optical axis of one coupling module is translated relative to the other is illustrated in FIG. 3A. Each coupling module 300 and 320 is shown in schematic form only. The first coupling module 300 has two input fibers 302 and 304, and produces two output beams 312 and 314 parallel to the optical axis 310 of the first module 300. Likewise, the second coupling module 320 has two input fibers 322 and 324, and beam paths 332 and 334 that are parallel to the optical axis 330 of the second module 320.

The bulk optical component 342 is positioned in the free-space 340 between the two coupling modules 300 and 320. The bulk optical component 342 translates optical beams passing therethrough, but does not change the direction of propagation. Thus, for example, the beam that is input to the bulk optical component 342 along beam path 312, is output along path 334, and vice versa. Also, the beam that is input along path 314 is output along path 334, and vice versa. Therefore, a bulk optical element 342 that offsets optical beams passing therethrough may be accommodated by the free-space device where the offset between the modules' optical axes 310 and 330 is equal to the amount by which the bulk optical component spatially translates passing optical beams in a transverse direction.

In the embodiment illustrated in FIG. 3B, the coupling modules 300 and 320 are the same as those illustrated in FIG. 3A. However, in this case the bulk optical element 392 deviates a beams passing therethrough by an amount θ, for example by reflecting the beams off a mirror 391. In order to accommodate this, the optical axes 310 and 330 are set at a relative angle of θ. Therefore, after the beam path 312 from the first coupling module 300 has been redirected by the bulk optical element 392, its path lies coincident, but antiparallel, with the beam path 332 from the second coupling module 320.

In the embodiment illustrated in the FIG. 3C, the bulk optical element 380 includes a partially reflecting surface 382, which may partially reflect the beams passing therethrough, or may totally reflect only some of the beams passing there through. The reflector 382 is illustrated as partially reflecting all of the beams passing through. A first coupling module 300 has input fibers 302 and 304, and produces respective parallelized beams 312 and 314. A portion of beam 312 is transmitted by the reflector 382 as beam 332 and is coupled into the second coupling module 320. The reflected portion of beam 312 is directed into the third coupling module 360 by the reflector 382 as beam 372. Likewise, a portion of beam 314 is transmitted by the reflector 382 as beam 334 and is coupled into the second coupling module 320. The reflected portion of beam 314 is directed into the third coupling module 360 by the reflector 382 as beam 374. The beams 332,334, 372 and 374 are then coupled to respective fibers 322, 324, 362 and 364 within the coupling modules 320 and 360. It will be appreciated that light may be coupled in a reverse direction into the first coupling module 300 from the second and third coupling modules 320 and 360. It is preferable in this embodiment that the conjugate planes of all three coupling modules 300, 320 and 360 are coincident, so as to preserve efficient coupling from one module to another.

It will be appreciated that other configurations may also be employed, for example by adding a fourth coupling module to the T-configuration of the embodiment illustrated in FIG. 3C to create a X-configuration coupler.

Figure 3D:
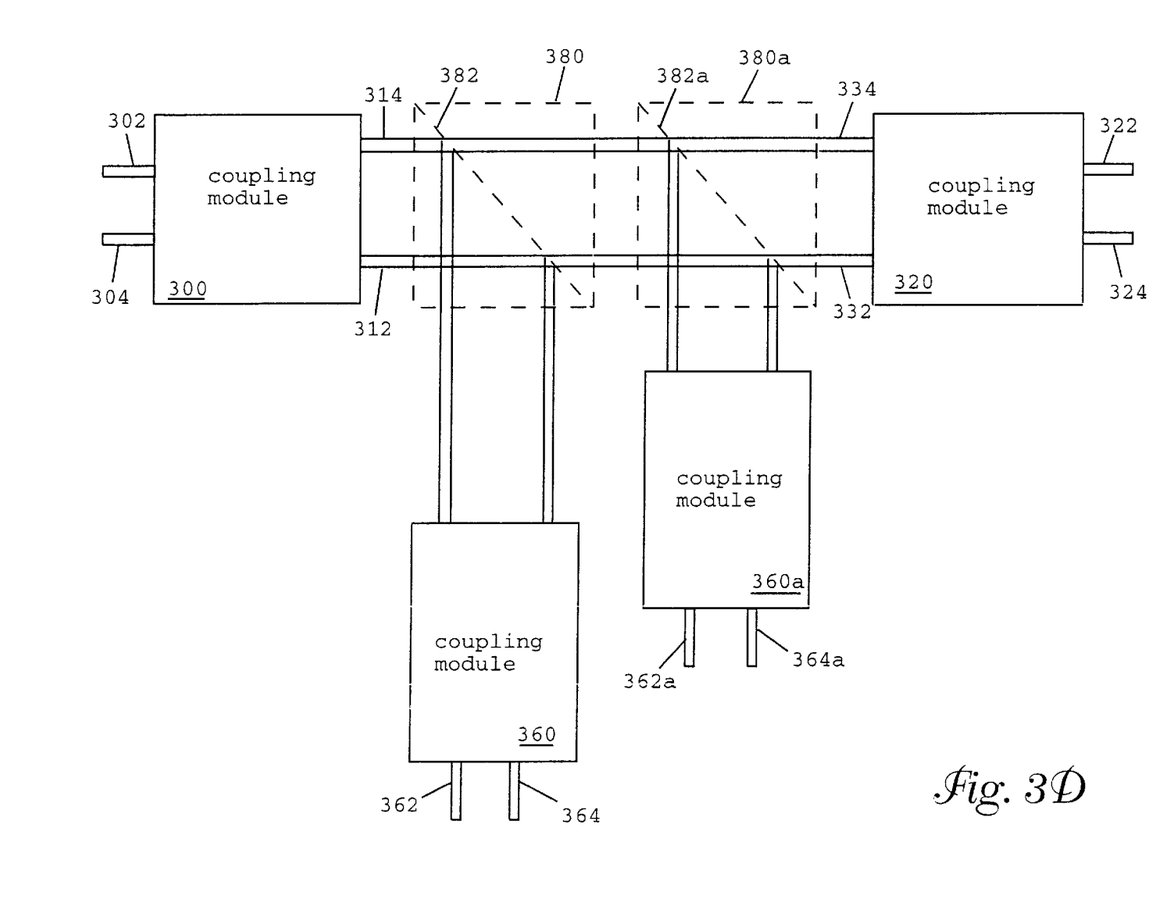

Furthermore, additional coupling modules may be cascaded using a number of partial reflectors so that light from a single module can be coupled into a number of other modules. This is illustrated in FIG. 3D, which shows a system similar to the one illustrated in FIG. 3C, except that a second bulk optical element 380a follows the first bulk optical element 380a, and a fourth coupling module 360a receives light from a partial reflecting surface 382a in the second bulk optical element 380. The second coupling module 320 receives light that has been transmitted through both of the bulk optical elements 380 and 380a. To increase the optical coupling efficiency from the first coupling module 300 to the other coupling modules 320, 360 and 360a, the optical path length between the first coupling module 300 and each of the other coupling modules 320, 360 and 360a is approximately equal to the sum of the image distances of the first coupling module 300 and the respective modules 320, 360 and 360a. For example, where the image distances of all the coupling modules 300, 320, 360 and 360a are the same value, d1, then the optical path length from the first coupling module 300 to each of the other coupling modules 320, 360 and 360a is set at approximately two times d1 for high optical coupling efficiency. Hence, the third coupling module 360 is displaced downwards in the figure relative to the fourth coupling module 360a in order to maintain a similar optical path length to the first coupling module 300.

As noted above, the present invention is applicable to fiber optic systems and is believed to be particularly useful in producing a free-space propagation region suitable to receive bulk optical components that require the free propagation of light, rather than guided wave propagation. A single coupling module may be useful in coupling between a number of fibers and a free space component in either or both the forward and reverse directions. Two coupling modules in a back-to-back arrangement permit coupling from one set of fibers to a free-space optical component and then into a second set of fibers. Although there may be one-to-one correspondence between the first and second sets of fibers, this is not a necessary condition, and there may be coupling only between one fiber of the first set and one fiber of the second set.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A method of producing a set of parallel light beams of outputs from a first set of optical fibers, comprising:

directing, with a first focusing element, output light beams from the optical fibers to intersect a first optical axis; and parallelizing, with a second focusing element, the output light beams so that the light beams, after intersecting the first optical axis, propagate in essentially parallel directions with a magnitude of a convergence angle less than a divergence angle of light output from the optical fibers.

2. A method as recited in claim 1, further comprising relaying an image, using the first and second focusing elements, of output faces of the optical fibers at a distance beyond the second focusing element approximately equal to a focal length of the second focusing element.

3. A method as recited in claim 1, further comprising arranging output faces of the optical fibers to lie approximately at a same distance from an input surface of the first focusing element.

4. A method as recited in claim 1, wherein the first focusing element is a first gradient index (GRIN) lens and further comprising arranging output faces of the optical fibers to be essentially on an input surface of the first GRIN lens.

5. A method as recited in claim 4, further comprising directing the output light beams to intersect the first optical axis at a point beyond an output face of the first GRIN lens.

6. A method as recited in claim 1, wherein parallelizing the output light beams with the second focusing element includes parallelizing the output light beams relative to the first optical axis.

7. A method as recited in claim 1, further comprising directing, with a third focusing element, the parallelized light beams to intersect a second optical axis; and focusing, using the fourth focusing element, the light beams into respective fibers of a second set of optical fibers.

8. A method as recited in claim 7, wherein the second optical axis is coincident with the first optical axis.

9. A method as recited in claim 7, wherein the fourth focusing element is a second GRIN lens and further including directing, with the third focusing element, the parallelized light beams to intersect the second optical axis at a point outside the second GRIN lens.

10. A device for parallelizing output beams from multiple optical fibers, comprising:

an assembly optically couplable to the multiple optical fibers to receive light therefrom, including a first focusing element positioned on a first optical axis to receive output light beams from the multiple optical fibers having first divergence angles, the first focusing element having a first focusing power selected to direct the light beams to intersect the first optical axis at a first intersection position; and a second focusing element spaced apart from the first focusing element by a first separation distance along the first optical axis and positioned to receive the light beams from the first focusing element, the second focusing element having a second focusing power, the first separation distance being selected to parallelize the light beams received from the first focusing element and to converge the light beams with convergence angles less than the first divergence angles.

11. A device as recited in claim 10, further comprising a plurality of pig-tailed optical fibers coupled to the assembly and couplable to the multiple optical fibers to receive light therefrom.

12. A device as recited in claim 11, wherein output ends of the pig-tailed optical fibers are symmetrically arranged in an array about the first optical axis.

13. A device as recited in claim 11, wherein output ends of the pig-tailed optical fibers are separated from a first face of the first focusing element by approximately a same distance.

14. A device as recited in claim 11, wherein the pig-tailed optical fibers contact to the first focusing element.

15. A device as recited in claim 11, wherein the pig-tailed optical fibers are coupled in a one dimensional pattern to the assembly.

16. A device as recited in claim 11, wherein the pig-tailed optical fibers are coupled in a two dimensional pattern to the assembly.

17. A device as recited in claim 10, wherein the first focusing power, the second focusing power and the first separation distance are selected to relay an input image at a distance separated from the second focusing element approximately equal to a focal length of the second focusing element.

18. A device as recited in claim 10, wherein the first focusing element is a GRIN lens and output ends of input optical fibers are coupled to a first surface of the GRIN lens.

19. A device as recited in claim 18, wherein intersection point between one or more of the light beams and the first optical axis lies outside the GRIN lens.

20. A device as recited in claim 10, wherein the second focusing element is oriented to parallelize the light beams parallel to the first optical axis.

21. A unit as recited in claim 10, wherein the second focusing element has a focal length longer than a focal length of the first focusing element.

22. An optical fiber free-space coupling unit for coupling to a plurality of optical fibers, comprising:

two coupling modules couplable to the plurality of optical fibers to receive light beams therefrom, each coupling module including:

a first focusing element positioned on a module optical axis having a first focusing power selected to direct the light beams to intersect the module optical axis, and a second focusing element spaced apart from the first focusing element by an interelement separation distance along the module optical axis and positioned to receive the light beams from the first focusing element, the second focusing element having a second focusing power, the interelement separation distance being selected to parallelize the light beams received from the first focusing element;

wherein the first and second coupling modules are oriented with opposing second focusing elements and a beam path of at least one of the parallellized beams from the first coupling module lying coincident and antiparallel to a beam path of at least one of the parallelized beams from the second coupling module.

23. A unit as recited in claim 22, further comprising first and second pluralities of pig-tailed fibers respectively connected to the first and second modules, and couplable to the plurality of optical fibers.

24. A unit as recited in claim 22, wherein the module optical axis of the first coupling module lies parallel to, and transversely displaced relative from, the module optical axis of the second optical axis.

25. A unit as recited in claim 22, wherein each module has a respective conjugate plane separated from the second focusing element by an image distance determined by the first focusing power, the second focusing power and the interelement separation distance.

26. A unit as recited in claim 25, wherein the image distances of the first and second coupling modules are approximately equal to respective focal lengths of the second focusing elements of the first and second coupling modules.

27. A unit as recited in claim 25, wherein the second focusing elements of the first and second coupling modules are separated by a distance equal to the sum of image distances of the first and second coupling modules.

28. A unit as recited in claim 22, wherein the first focusing power, the second focusing power and interelement separation distance of the first coupling module are respectively approximately equal to first focusing power, the second focusing power and interelement separation distance of the second coupling module.

29. A unit as recited in claim 22, wherein an intermodule separation distance between the respective second focusing elements of the first and second coupling modules is approximately equal to a sum of focal lengths of the respective second focusing elements of the first and second coupling modules.

30. A unit as recited in claim 22, further including a beam deflecting element positioned between the second focusing elements of the first and second coupling modules, arranged to deflect light travelling parallel to the first optical axis to be parallel with the second optical axis.

31. A unit as recited in claim 22, further comprising an optical circulator element positioned between the first and second coupling modules.

32. A unit as recited in claim 22, further comprising an optical filter between the first and second coupling modules.

33. A unit as recited in claim 22, further comprising an optical switch between the first and second coupling modules.

34. A unit as recited in claim 22, wherein the module optical axis of the first coupling module lies coincident with the module optical axis of the second coupling module.

35. A unit as recited in claim 22, wherein the second focusing element has a focal length longer than a focal length of the first focusing element.

36. A unit as recited in claim 22, further comprising a gap between the coupling modules for receiving a bulk optical device.

37. A unit for producing a set of parallel light beams of outputs from a set of optical fibers, comprising:

means for directing output light beams from the optical fibers to intersect a first optical axis; and means for parallelizing output light beams so that the light beams, after intersecting with the first optical axis, propagate in parallel directions, wherein, after passing through the means for parallelizing, the output light beams have a convergence angle less than a divergence angle of light propagating out of the optical fibers.

38. A unit for controlling light beams propagating through a plurality of fibers, comprising:

a plurality of first optical fibers;

a plurality of second optical fibers; and two coupling modules coupled to respective pluralities of first and second optical fibers, each coupling module including a first focusing element positioned on a module optical axis having a first focal length selected to direct light beams from a respective set of optical fibers to intersect a module optical axis, and a second focusing element spaced apart from the first focusing element by an interelement separation distance along the module optical axis and positioned to receive the light beams from the first focusing element, the second focusing element having a second focal length, the interelement separation distance being selected to parallelize the light beams received from the first focusing element;

wherein the first focal length, the second focal length and the interelement separation distance of the first coupling module are respectively the same as the first focal length, second focal length and interelement separation distance of the second coupling module, the first and second coupling modules are oriented having opposing second focusing elements separated by a distance approximately equal to twice the focal length of the second focusing element of the first module, and the first and second coupling modules are relatively positioned so that beam paths of the parallellized beams from the first coupling module are coincident with respective beam paths of the parallelized beams from the second coupling module.

\* \* \* \* \*